US008035842B2

(12) United States Patent
Kouchi et al.

(10) Patent No.: US 8,035,842 B2
(45) Date of Patent: Oct. 11, 2011

(54) APPARATUS AND METHOD FOR CHANGING STORAGE METHODS OF IMAGE DATA BASED ON AVAILABLE STORAGE CAPACITY

(75) Inventors: Miki Kouchi, Kanagawa (JP); Tetsuo Asakawa, Tokyo (JP); Rie Nakamura, Kanagawa (JP); Akihiro Kakoi, Kanagawa (JP); Yoshinori Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1129 days.

(21) Appl. No.: 11/765,082

(22) Filed: Jun. 19, 2007

(65) Prior Publication Data
US 2008/0043292 A1    Feb. 21, 2008

(30) Foreign Application Priority Data

Jul. 10, 2006   (JP) .................................. 2006-189842

(51) Int. Cl.
*G06K 15/00*    (2006.01)
(52) U.S. Cl. ..... 358/1.16; 358/404; 358/1.17; 358/1.13; 382/298; 382/299
(58) Field of Classification Search .................. 358/1.13, 358/1.15, 1.16, 1.17, 404, 1.2, 1.9, 538, 527, 358/528, 426.05, 426.06; 382/239, 244, 382/248, 298, 299
See application file for complete search history.

(56) References Cited

U.S. PATENT DOCUMENTS

| 5,471,563 | A   | * | 11/1995 | Dennis et al. .............. 358/1.15 |
| 5,611,024 | A   | * | 3/1997  | Campbell et al. ........... 358/1.15 |
| 6,236,755 | B1  | * | 5/2001  | Kashiwazaki ................ 382/239 |
| 6,519,052 | B1  | * | 2/2003  | Oneda et al. ................. 358/1.16 |
| 7,133,151 | B2  | * | 11/2006 | Nakao .......................... 358/1.16 |
| 7,194,140 | B2  | * | 3/2007  | Ito et al. ....................... 382/251 |
| 2001/0040699 | A1 | * | 11/2001 | Osawa et al. ................ 358/1.17 |

FOREIGN PATENT DOCUMENTS

| JP | 5-83509      | 4/1993  |
| JP | 10-337934    | 12/1998 |
| JP | 11-341201    | 12/1999 |
| JP | 2000-175009  | 6/2000  |
| JP | 2000-259487  | 9/2000  |
| JP | 2000-278477  | 10/2000 |
| JP | 2001-103254  | 4/2001  |
| JP | 2001-103255  | 4/2001  |
| JP | 2001-245122  | 9/2001  |
| JP | 2001-358898  | 12/2001 |
| JP | 2003-87538   | 3/2003  |
| JP | 2003-152955  | 5/2003  |
| JP | 2004-228839  | 8/2004  |
| JP | 2005-22875   | 1/2005  |

* cited by examiner

*Primary Examiner* — Twyler Haskins
*Assistant Examiner* — Dennis Dicker
(74) *Attorney, Agent, or Firm* — Oblon, Spivak, McClelland, Maier & Neustadt, L.L.P.

(57) ABSTRACT

A disclosed image forming apparatus includes: an image data input unit inputting image data; an image data storage unit storing the image data; a storage method change unit changing a storage method of the image data; an image data output unit outputting the image data; an available capacity detection unit detecting available capacity of the image data storage unit; an available capacity judgment unit judging whether the available capacity is not more than a predetermined value; and a storage method selection unit prompting selection of a storage method performed by the image data storage unit. When the available capacity is judged to be not more than the predetermined value, the storage method selection unit prompts the selection of a storage method, the storage method change unit changes the storage method of the image data, and the image data output unit outputs image data.

18 Claims, 16 Drawing Sheets

APPARATUS AND METHOD FOR CHANGING STORAGE METHODS OF IMAGE DATA BASED ON AVAILABLE STORAGE CAPACITY

BACKGROUND OF THE INVENTION

1. Field of the Invention

The present invention relates to an image forming apparatus.

2. Description of the Related Art

Conventionally, image forming apparatuses such as copying machines temporarily store entire image data for image formation in a memory and then perform image formation using the stored image data. In this case, in order to realize a function of processing data on plural pages of a document (sorting function, for example), storage capacity for the plural pages is necessary. However, in image forming apparatuses with small storage capacity, the number of pages allowed for accumulation is limited, so that an image forming process may be aborted due to an excess of data while the document is being read. Thus, a function such as the sorting function is not effectively realized. In other words, even when the document is read, a request from a user may not be satisfied after all (sorting is not supported for all the pages of the document, for example).

In view of this, conventionally, various types of inventions have been made so as to efficiently use the small storage capacity of the image forming apparatuses Patent Document 1 discloses a technology of an image forming apparatus in which operating efficiency is improved using a memory for compression and a page memory. When a document is read, data compressed with a predetermined compression ratio is stored in the memory for compression and uncompressed data is stored in the page memory. Patent Document 1 is intended to improve the operating efficiency by compressing data again with a higher compression ratio and storing the compressed data in the memory for compression again without returning the read document when available capacity of the memory for compression becomes not more than a predetermined value (hereafter referred to as full memory).

Patent Document 1: Japanese Laid-Open Patent Application No. 2003-152955

However, in low-priced apparatuses, it is impossible to employ plural memories as disclosed in Patent Document 1: Japanese Laid-Open Patent Application No. 2003-152955 and it is impossible to prevent a reduction of operating efficiency resulting from the full memory.

SUMMARY OF THE INVENTION

It is a general object of the present invention to provide an improved and useful image forming apparatus in which the above-mentioned problems are eliminated.

A more specific object of the present invention is to provide an image forming apparatus that can improve the operating efficiency when the full memory is generated and prevent an increase of cost without installing an additional memory.

According to one aspect of the present invention, there is provided an image forming apparatus comprising: an image data input unit inputting image data; an image data storage unit storing the image data input by the image data input unit; a storage method change unit changing a storage method of the image data input by the image data input unit; an image data output unit outputting the image data stored in the image data storage unit; an available capacity detection unit detecting available capacity of the image data storage unit; an available capacity judgment unit judging whether the available capacity is not more than a predetermined value; and a storage method selection unit prompting selection of a storage method performed by the image data storage unit, wherein when the available capacity is judged to be not more than the predetermined value by the available capacity judgment unit, the storage method selection unit prompts the selection of a storage method, the storage method change unit changes the storage method of the image data based on the storage method selected in the storage method selection unit, and the image data output unit outputs image data stored in accordance with the changed storage method.

In accordance with this, it is possible to provide an image forming apparatus capable of improving operating efficiency when the full memory is generated and to prevent an increase of cost without installing an additional memory.

According to another aspect of the present invention, the image forming apparatus of the present invention may include: an operation display unit, wherein the operation display unit prompts the selection of a storage method performed by the image data storage unit.

In accordance with this, it is possible to provide an image forming apparatus capable of improving the operating efficiency at user's convenience when the full memory is generated.

According to another aspect of the present invention, the image forming apparatus of the present invention may include: a storage method storing unit storing the storage method, wherein the storage method storing unit stores the storage method selected in the storage method selection unit even when the image forming apparatus is powered off.

In accordance with this, it is possible to provide an image forming apparatus capable of improving, while the apparatus is powered on, the operating efficiency when the full memory is generated based on setting already determined by the user.

According to another aspect of the present invention, in the image forming apparatus of the present invention, the storage method prompted by the storage method selection unit may be determined in advance.

According to another aspect of the present invention, in the image forming apparatus of the present invention, the storage method may be for reducing and storing the image data.

In accordance with this, it is possible to provide an image forming apparatus capable of reducing a cost upon outputting the image data.

According to another aspect of the present invention, in the image forming apparatus of the present invention, the storage method may be for putting together and storing the image data.

In accordance with this, it is possible to provide an image forming apparatus capable of reducing a cost upon outputting the image data.

According to another aspect of the present invention, in the image forming apparatus of the present invention, the storage method may be for reducing a period of time for reading the image data into the image data storage unit or a period of time for reading out the image data from the image data storage unit.

In accordance with this, it is possible to provide an image forming apparatus capable of reducing a period of finishing time upon outputting the image data.

According to another aspect of the present invention, in the image forming apparatus of the present invention, the storage method may be for storing the image data with resolution lower than resolution of image data stored in the image data storage unit before the storage method is changed.

In accordance with this, it is possible to provide an image forming apparatus capable of reducing a period of finishing time upon outputting the image data. Further, it is possible to provide an image forming apparatus capable of finishing such that an output image and an original image do not have much difference in terms of appearance.

According to another aspect of the present invention, in the image forming apparatus of the present invention, the storage method may be for sequentially deleting the image data from the image data storage unit, the image data being output by the image data output unit, and storing the image data without storing entire image data input by the image data input unit.

In accordance with this, it is possible to provide an image forming apparatus capable of efficiently using the memory.

According to another aspect of the present invention, in the image forming apparatus of the present invention, when the image data includes a color image, the storage method may be for changing a color mode of the image data to a monochrome mode of the image data and storing monochrome image data.

In accordance with this, it is possible to provide an image forming apparatus capable of efficiently using the memory.

According to the image forming apparatus of the present invention, it is possible to improve the operating efficiency when the full memory is generated and prevent an increase of cost without installing an additional memory.

Other objects, features and advantage of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings. In the present embodiment, although a printer is used as an example of an image forming apparatus, other image forming apparatus may be used instead.

Embodiment (Structure)

Figure 1:
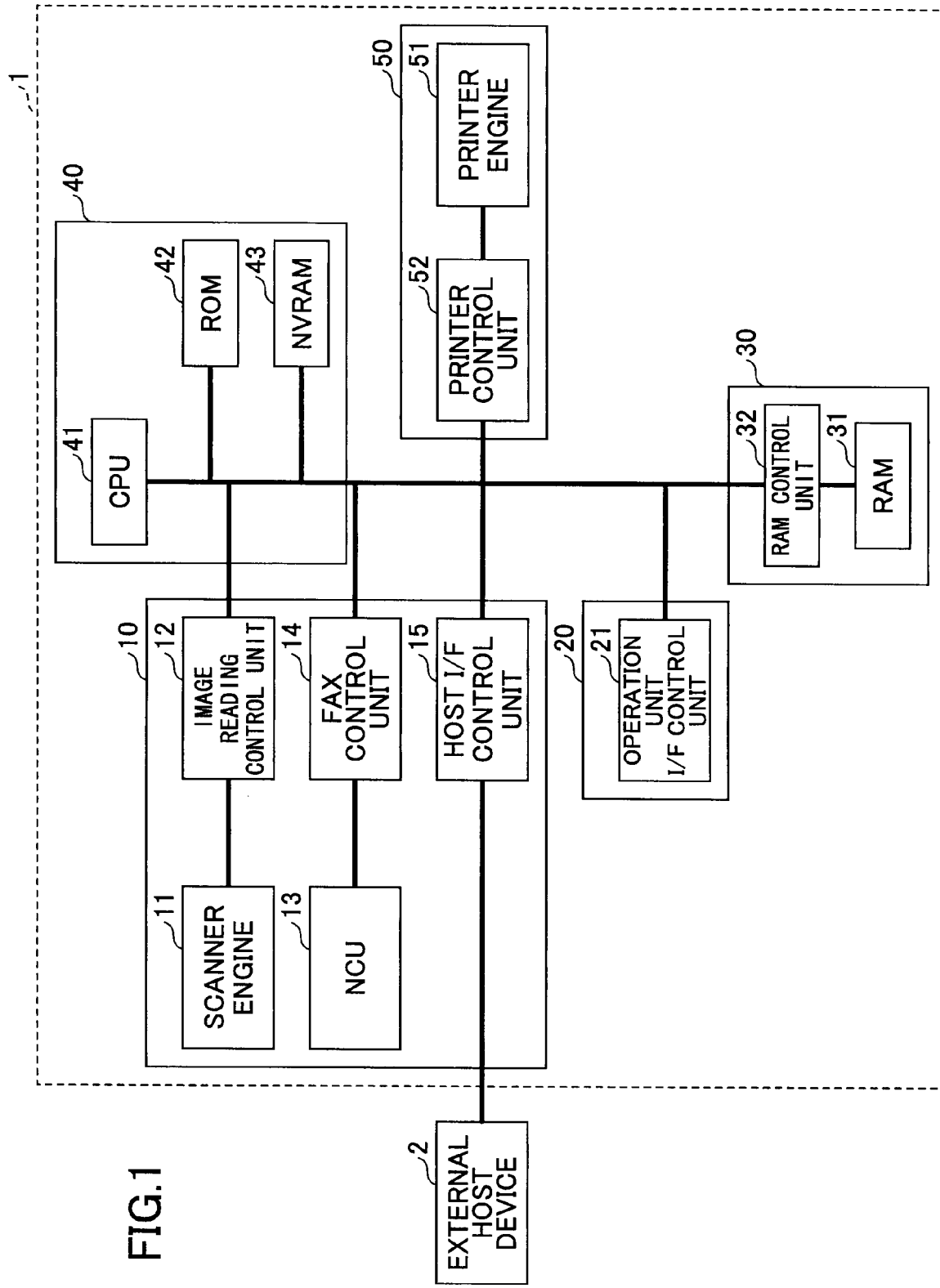
FIG. 1 is a diagram showing a configuration of a printer 1 as an example of an image forming apparatus according to the present invention.

In the following, a configuration of an image forming apparatus according to the present invention is described with reference to FIG. 1. FIG. 1 is a diagram showing a configuration of a printer 1 as an example of an image forming apparatus according to the present invention.

In FIG. 1, the printer 1 includes an input unit 10, an operation unit 20, a storage unit 30, a control unit 40, and an output unit 50.

The input unit 10 is a device for inputting an image used for image formation. The input unit 10 includes a scanner engine 11 described later, an image reading control unit 12, an NCU 13, a FAX control unit 14, and a host I/F control unit 15, for example.

The scanner engine 11 is a device for inputting a document and has copier and scanner functions. The scanner engine 11 is controlled by an image reading control unit 12 described later and inputs documents.

The NCU 13 is a device for connecting the printer 1 to a public line. For example, when the printer 1 has a facsimile function, the printer 1 receives documents using the facsimile function via the NCU 13. The received facsimile data (usually encoded) is subjected to processing such as decoding by the FAX control unit 14 described later.

The FAX control unit 14 performs decoding of print data received from the NCU 13, for example.

The host I/F control unit 15 receives print data from an external host device 2, for example. Types of I/F include IEEE1284, local connection such as USB, network connection such as wired or wireless Ethernet (registered trademark), and the like.

The operation unit 20 is a man-machine interface for a machine operator such as buttons for operating the printer 1 and indicators (including LED, LCD, a loudspeaker, and the like) for displaying conditions of the printer 1. Input and output of information is performed via an operation unit I/F control unit 21 described later.

The operation unit I/F control unit 21 controls the input and output of information in the operation unit 20.

The storage unit 30 is a device for storing data such as image data. The storage unit 30 includes a RAM 31 and a RAM control unit 32, for example.

The RAM 31 is a storage device for temporarily storing data processed in the input unit 10 and each control unit. The data includes image data, various types of application programs. The RAM 31 is controlled by the RAM control unit 32 described later.

The RAM control unit 32 controls the RAM 31.

The control unit 40 is a device for controlling the printer 1. The control unit 40 includes a CPU 41, a ROM 42, and an NVRAM 43 described later, for example.

The CPU 41 is a device for controlling an entire portion of the printer 1 in accordance with a control program stored in the RAM 31 and the ROM 42 described later.

The ROM 42 is a device for storing a program for controlling the printer 1. Plural ROMs may be installed so as to improve processing performance.

The NVRAM 43 is a non-volatile memory. The NVRAM 43 is used so as to hold device-specific information such as a counter value of copy sheets and the like.

The output unit 50 is a device for outputting a formed image. The output unit 50 includes a printer engine 51 and a printer control unit 52 described later.

The printer engine 51 is a device for printing an image. Image formation methods include a laser method, an LED method, an ink-jet method, and the like. The printer engine 51 is controlled by the printer control unit 52 described later.

The printer control unit 52 controls the printer engine 51.

In accordance with the above-mentioned structure, in the printer 1, image data input from the input unit 10 is stored in the storage unit 30. The stored image data is output from the output unit 50.

Further, in the printer 1 according to the present invention, when available capacity of the RAM 31 becomes not more than a predetermined value (hereafter referred to as full memory) due to input image data, the control unit 40 changes a method for storing the image data in the RAM 31. In the following, a structure of the printer 1 for realizing the change is described.

(Functional Block Diagram)

An example of the structure of the image forming apparatus according to the present invention is described with reference to FIG. 2.

Figure 2:
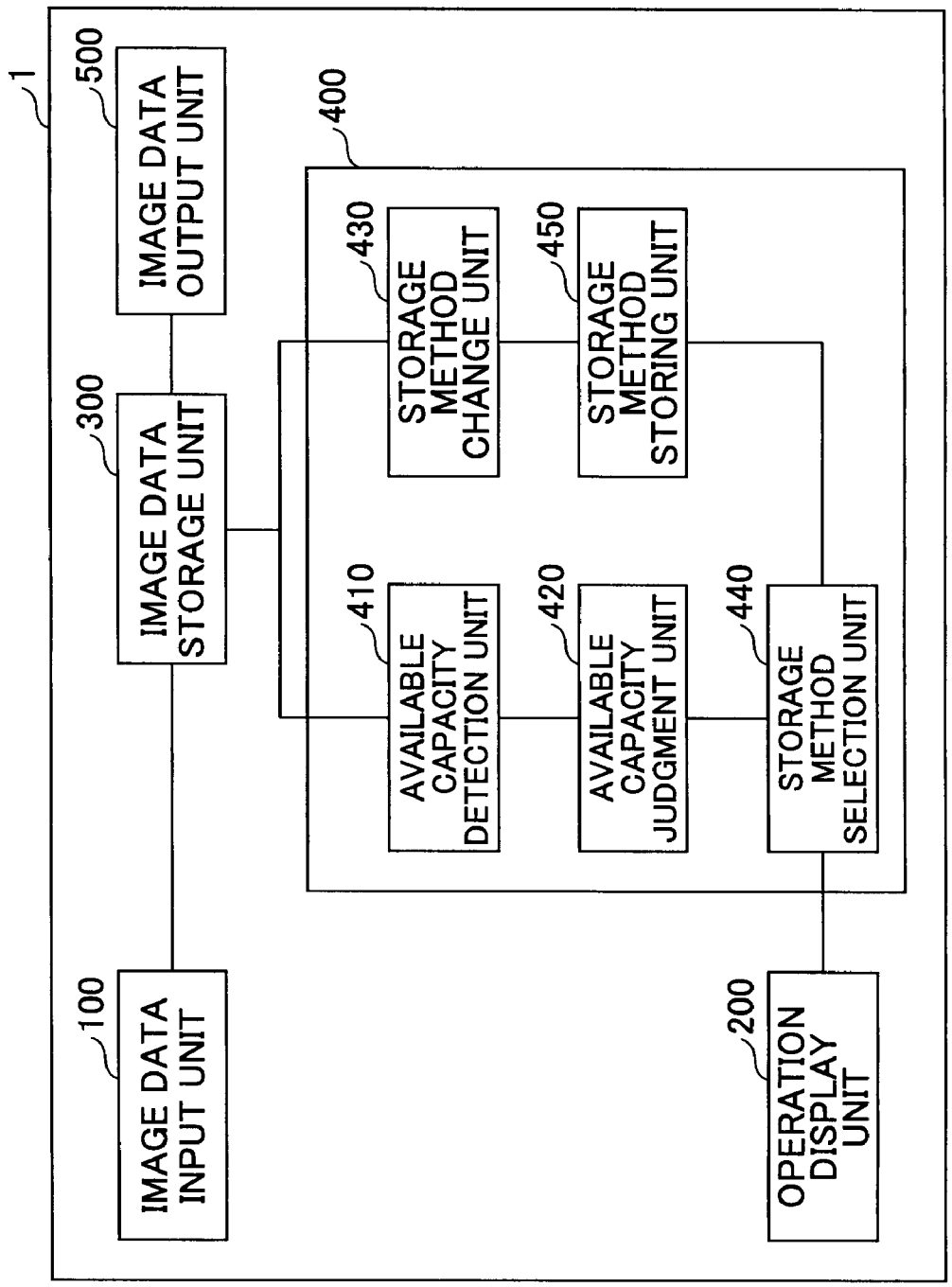
FIG. 2 is a functional block diagram showing an image forming apparatus according to the present invention.

FIG. 2 is a functional block diagram showing the image forming apparatus according to the present invention.

In FIG. 2, the printer 1 includes an image data input unit 100, an operation display unit 200, an image data storage unit 300, a storage method control unit 400, and an image data output unit 500. The storage method control unit 400 includes an available capacity detection unit 410, an available capacity judgment unit 420, a storage method change unit 430, a storage method selection unit 440, and a storage method storing unit 450.

The image data input unit 100 inputs image data. An example of the image data input unit 100 includes the input unit 10.

The operation display unit 200 performs image display. An example of the operation display unit 200 includes the operation unit 20. The operation display unit 200 is a display disposed in the printer 1. The operation display unit 200 has a function of a man-machine interface on which a user performs operation.

The image data storage unit 300 stores the image data input by the image data input unit 100. An example of the image data storage unit 300 includes the RAM 31 in the storage unit 30. The image data storage unit 300 stores the image data based on the storage method stored in the storage method storing unit 450 described later.

The storage method control unit 400 controls an entire system of the printer 1. Examples of the storage method control unit 400 include the control unit 40, the image reading control unit 12, the FAX control unit 14, the host I/F control unit 15, the operation unit I/F control unit 21, the RAM control unit 32, and the printer control unit 52. The storage method control unit 400 includes the available capacity detection unit 410, the available capacity judgment unit 420, the storage method change unit 430, the storage method selection unit 440, and the storage method storing unit 450 described later, for example.

The available capacity detection unit 410 detects available capacity of the image data storage unit 300. An example of the available capacity detection unit 410 includes the RAM control unit 32. The available capacity detection unit 410 detects the available capacity of the RAM 31.

The available capacity judgment unit 420 judges whether the available capacity detected by the available capacity detection unit 410 is not more than a predetermined value (full memory). An example of the available capacity judgment unit 420 includes the RAM control unit 32.

The storage method change unit 430 changes the storage method of the image data storage unit 300. An example of the storage method change unit 430 includes the RAM control unit 32.

The storage method selection unit 440 prompts selection of the storage method of the image data storage unit 300. An example of the storage method selection unit 440 includes the operation unit I/F control unit 21. The storage method selection unit 440 prompts the selection of the storage method using the operation display unit 200.

The storage method storing unit 450 stores the storage method of the image data storage unit 300. An example of the storage method storing unit 450 includes the NVRAM 43 in the control unit 40.

The image data output unit 500 outputs the image data stored in the image data storage unit 300. An example of the image data output unit 500 includes the output unit 50.

In accordance with the above-mentioned structure, in the printer 1, the image data input by the image data input unit 100 is stored in the image data storage unit 300. The stored image data is output from the image data output unit 500.

Further, in the printer 1 of the present invention, the storage method control unit 400 changes the storage method of image data in the image data storage unit 300 so as to improve efficiency of the image data storage unit 300 upon detecting that the image data storage unit 300 becomes full memory due to the input image data.

In the following, an example of a flow of operation is described in which the storage method control unit 400 detects the full memory of the image data storage unit 300. Next, an example of a flow of operation is described in which the storage method of image data in the image data storage unit 300 is changed.

(Operational Example for Detecting Full Memory)

Figure 3:
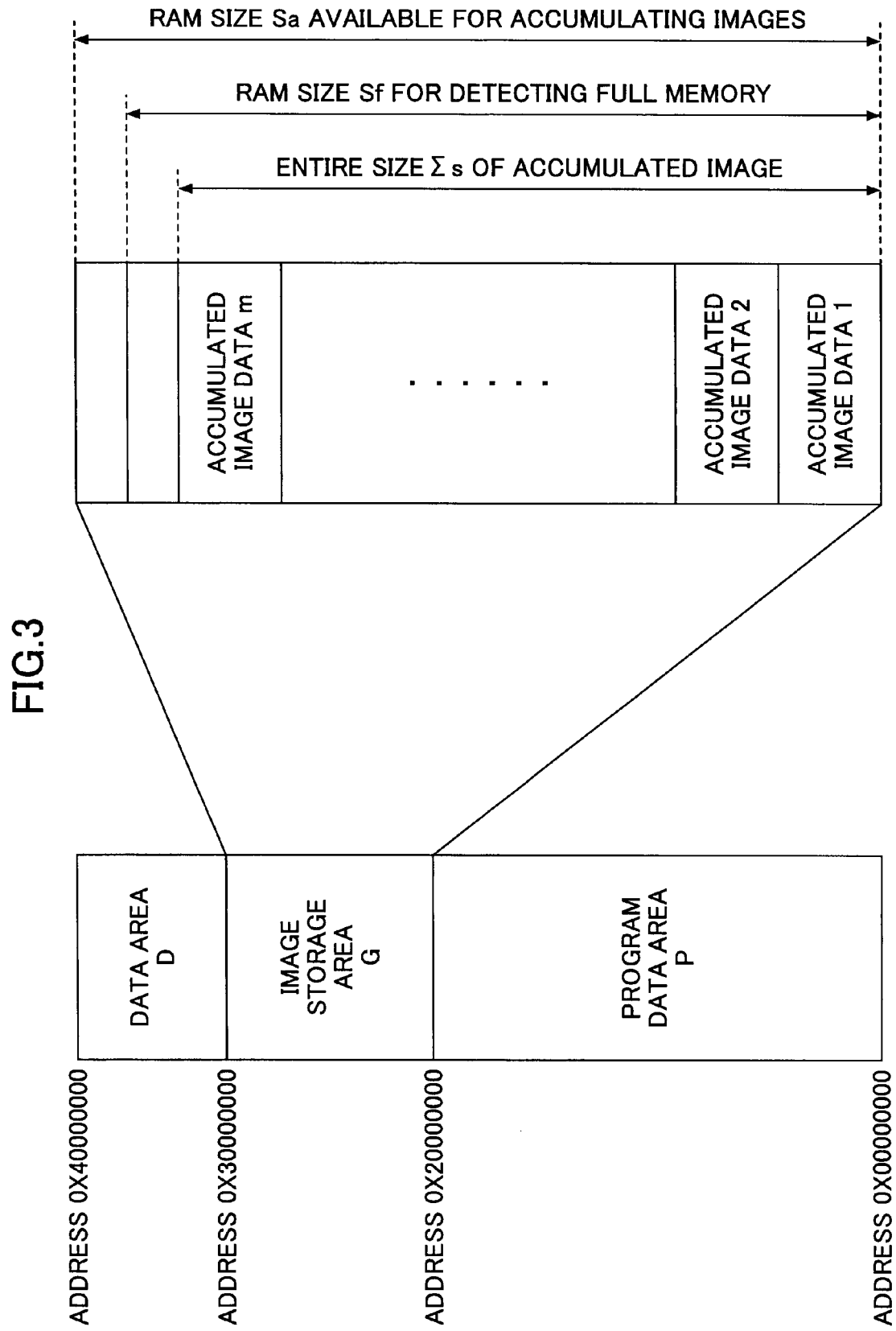
FIG. 3 is a diagram showing an image data storage unit 300 of an image forming apparatus according to the present invention.

An example of a flow of operation until the image data storage unit 300 becomes full memory is described. Although the RAM 31 is used for description as an example of the image data storage unit 300 in the present embodiment, other image data storage unit may be used. FIG. 3 is a diagram showing an example of the RAM 31 of the image forming apparatus according to the present invention.

In FIG. 3, a storage area of the RAM 31 includes an image storage area G, a program data area P, and a data area D.

The image storage area G is a storage area for storing image data. For example, the image storage area G stores image data input by the image data input unit 100. Further, as shown on a right side of FIG. 3, in the image storage area G, a maximum capacity available for accumulating images is a maximum accumulation capacity $S_a$, a capacity used as a threshold for detecting the full memory is a full memory detection capacity $S_f$, and an entire capacity of image data already accumulated is an accumulated image data capacity $\Sigma S$.

The program data area P is a storage area for storing various application programs.

The data area D stores various setting conditions in the image forming apparatus, calculated values upon executing a program, and the like.

When the image data storage unit 300 becomes full memory, this status is used synonymously with a case where a total of image data capacity that has been accumulated reaches the full memory detection capacity Sf in the image storage area G. A flow of this operation is described in the following.

First, the available capacity detection unit 410 detects an available capacity of the image storage area G based on the above-mentioned maximum accumulation capacity Sa, the accumulated image data capacity $\Sigma S$, and an image data capacity S of image data to be accumulated. Specifically, the available capacity detection unit 410 detects a value expressed by: Sa (maximum accumulation capacity)−($\Sigma S$+S) (accumulated image data) as the available capacity.

Next, the available capacity judgment unit 420 detects a full memory status based on the available capacity. Specifically, when the full memory detection capacity Sf, the accumulated image data capacity $\Sigma S$, and the image data capacity S have a relationship expressed by: Sf<$\Sigma S$+S, this status is detected as the full memory.

In accordance with the above-mentioned structure and operation, the full memory of the image data storage unit 300 is detected by the available capacity detection unit 410 and the available capacity judgment unit 420 in the storage method control unit 400.

(Example of Operation Display Unit 200)

The following describes an example of a flow of operation in which the storage method control unit 400 changes the method for storing the image data in the image data storage unit 300. In the printer 1 of the present invention, first, plural methods for storing image data are set in advance as candidates via the operation display unit 200. Then, the method for storing image data in the image data storage unit 300 is changed to a single storage method extracted through priority setting (details are described in the following operational example), for example, from the plural methods for storing image data set in advance. This flow is described in the following.

Figure 4:
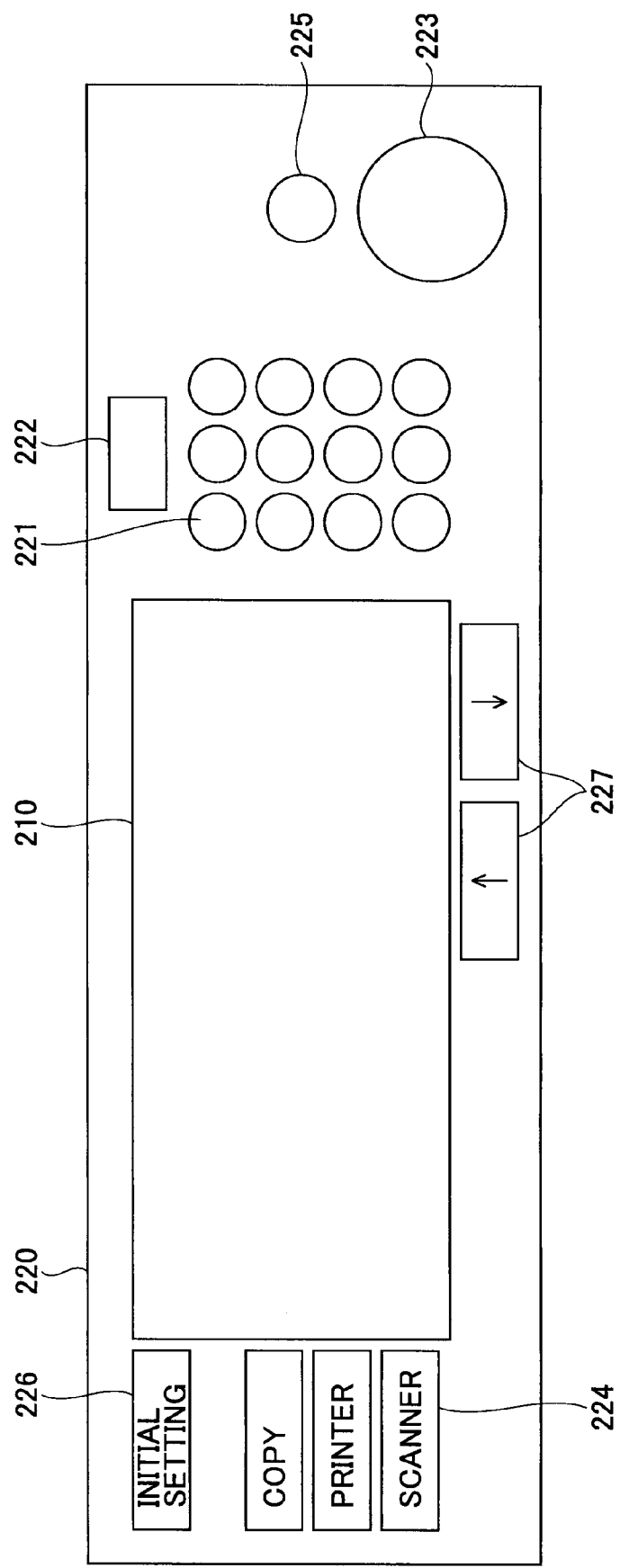
FIG. 4 is a diagram showing an operation display unit 200 of an image forming apparatus according to the present invention.

First, the following describes the flow of setting the plural methods for storing image data in advance as candidates via the operation display unit 200. FIG. 4 is a diagram showing the operation display unit 200 of the image forming apparatus according to the present invention.

In FIG. 4, the operation display unit 200 includes a display portion 210 and an operation portion 220. The operation portion 220 further includes a numeric keypad 221, a reset key 222, a start key 223, an application switch key 224, a clear/stop key 225, an initial setting key 226, and a selection key 227.

The display portion 210 displays character strings, bit-mapped images, and the like. An example of the display portion 210 includes a display.

The operation portion 220 is an operation member for allowing a user to input operation information. The operation portion 220 includes the numeric keypad 221 described later, the reset key 222, the application switch key 224, the clear/stop key 225, the initial setting key 226, and the selection key 227 described later.

The numeric keypad 221 is a collection of buttons used for inputting a number of copies and the like.

The reset key 222 is a button used for resetting a copy mode.

The start key 223 is a button used for instructing a start of copying, reading of a document, and the like.

The application switch key 224 is a collection of buttons used for switching among a copy function, a printer function, a scanner function, and the like.

The clear/stop key 225 is a button used for aborting copying and resetting the number of copies.

The initial setting key 226 is a button used for setting an initial value of setting for the copy function, the printer function, the scanner function, and the like.

The selection key 227 is a button used when a function displayed on the display portion 210 is selected.

In this structure, although the keyboard is constructed using hard keys, it is possible to use a soft keyboard displayed on a liquid crystal touch panel instead.

In accordance with the above-mentioned structure, in the operation display unit 200, the display portion 210 performs screen display. The operation display unit 200 has a function of a man-machine interface on which the user performs operation via the operation portion 220.

In the printer 1, display contents of the operation display unit 200 are different in three mode of an administrator mode, an initial setting mode, and a normal operation mode. A screen is changed to the administrator mode by using a combination of the numeric keypad 221, the reset key 222, the clear/stop key 225, and the start key 223. The screen is changed to the initial setting mode by pressing the initial setting key 226. The screen is changed to the normal operation mode by pressing the application switch key 224.

In addition, the screen may be changed to the administrator mode by using code numbers. Further, the screen may be changed to the normal operation mode with a dedicated priority method selection setting key (not shown in the drawings) or the screen may automatically be changed to the normal operation mode when a selected mode has a possibility of insufficient memory due to copy mode setting by the user. Examples of the mode having a possibility of insufficient memory include a sorting mode where plural copies are output.

The following describes the flow of operation in which plural methods for storing image data are set in advance as candidates via the operation display unit 200 described above. Specifically, the method is set based on display contents of each of the administrator mode, the initial setting mode, and the normal operation mode. The display contents and a setting method are described with reference to FIGS. 5 to 7.

(Display Contents of Operation Display Unit 200 and Setting Method)

Figure 5:
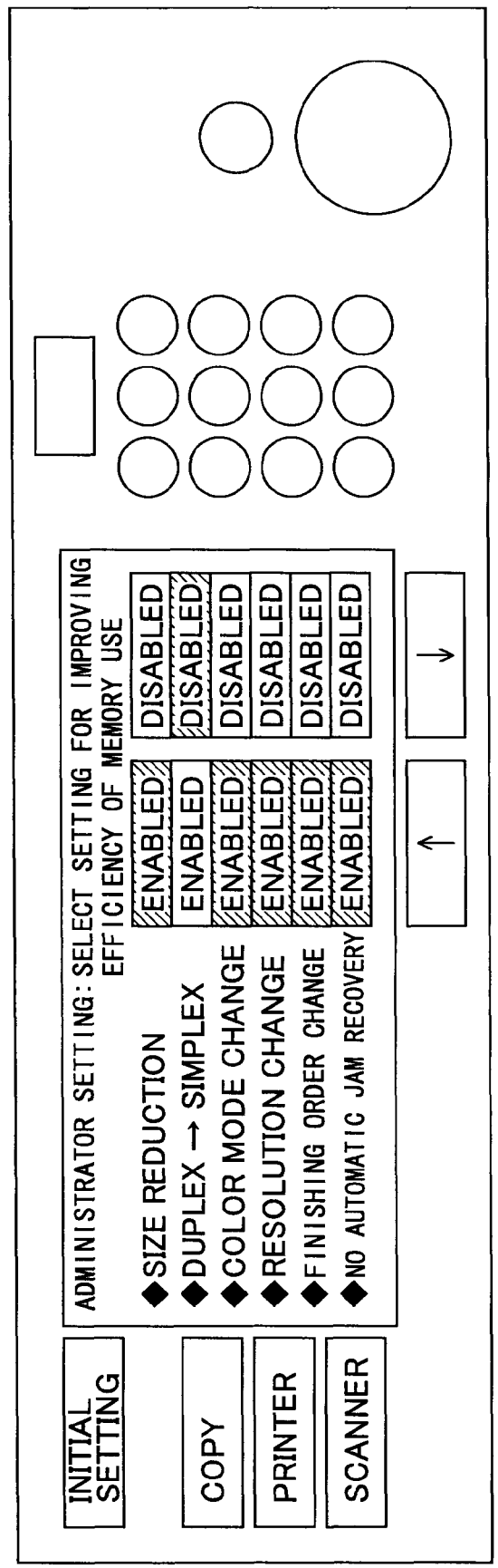
FIG. 5 is a diagram showing an example of display contents in an administrator mode of an embodiment.

In FIG. 5, six items of size reduction, duplex→simplex, color mode change, resolution change, finishing order change, and no automatic jam recovery are examples of the method for storing image data for improving the efficiency of the RAM 31. Details of each item are described in the following operational example.

In the display contents of the administrator mode, it is possible to select a status of each item to be enabled or disabled as shown in FIG. 5. An administrator sets the status of an available method as enabled. In the example of FIG. 5, the administrator sets the duplex→simplex as disabled. This indicates that the duplex→simplex is prohibited with administrator authority since simplex printing will lead to an increase of cost.

Figure 6:
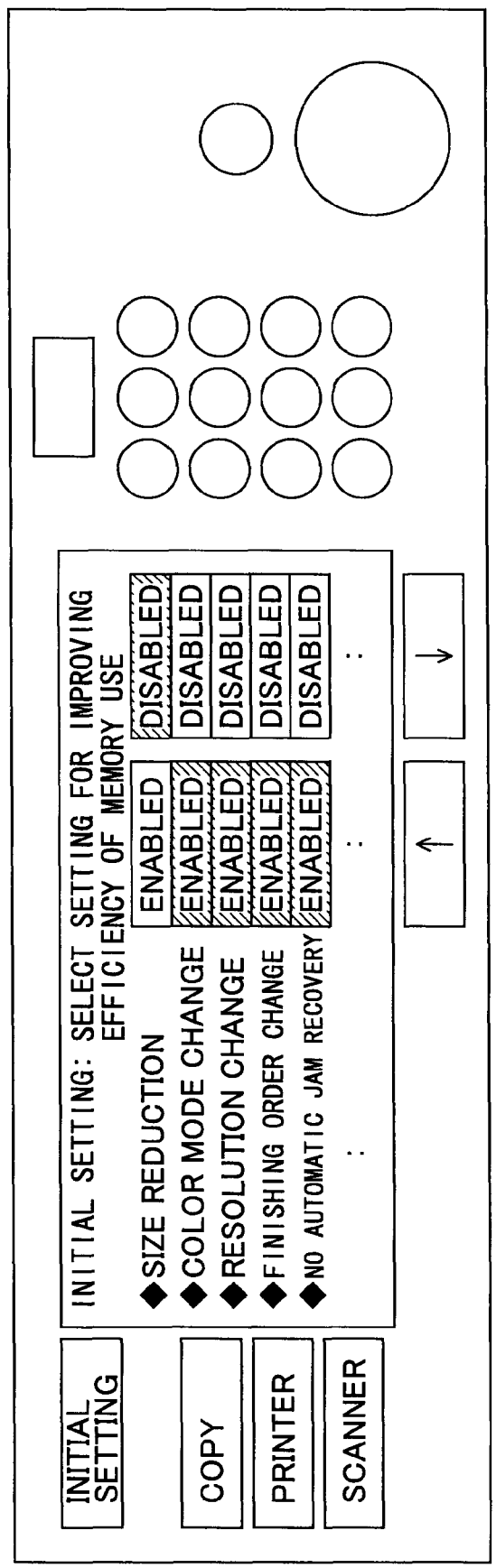
FIG. 6 is a diagram showing an example of display contents in an initial setting mode of an embodiment.

Next, an example of display contents in the initial setting mode is described with reference to FIG. 6. FIG. 6 is a diagram showing the example of display contents in the initial setting mode.

In FIG. 6, five items of the size reduction, color mode change, resolution change, finishing order change, and no automatic jam recovery are displayed. In this case, the displayed items are set as enabled in the administrator mode (refer to FIG. 5). In FIG. 6, the size reduction is disabled as an initial setting.

Figure 7:
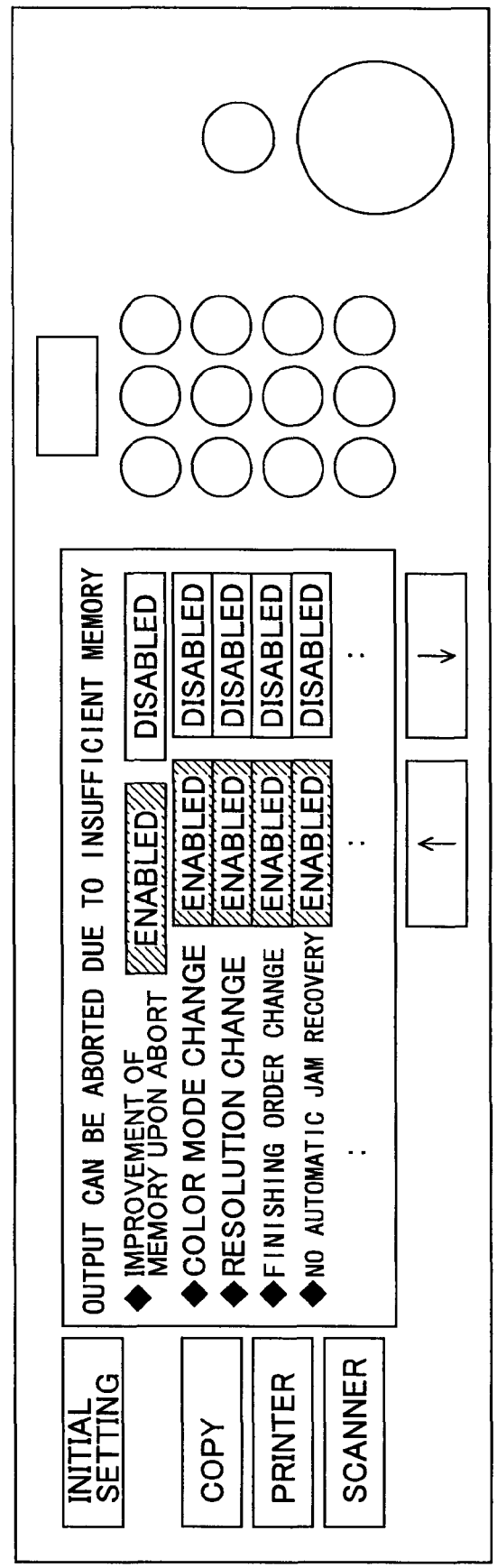
FIG. 7 is a diagram showing an example of display contents in a normal operation mode of an embodiment.

Next, an example of display contents in the normal operation mode is described with reference to FIG. 7. FIG. 7 is a diagram showing the example of display contents in the normal operation mode.

In FIG. 7, four items of the color mode change, resolution change, finishing order change, and no automatic jam recovery are displayed. In this case, the displayed items are set as enabled in the initial setting mode (refer to FIG. 6). In FIG. 7, it is possible to select an item of improvement of memory efficiency upon abort.

The items set as enabled in all the modes are set to be plural methods for storing image data in advance as candidates for improving the efficiency of memory use. And the items are stored in the storage method storing unit 450 of the storage method control unit 400, for example. A judgment of whether this setting is valid or invalid is made based on a flow described in the following.

Figure 8:
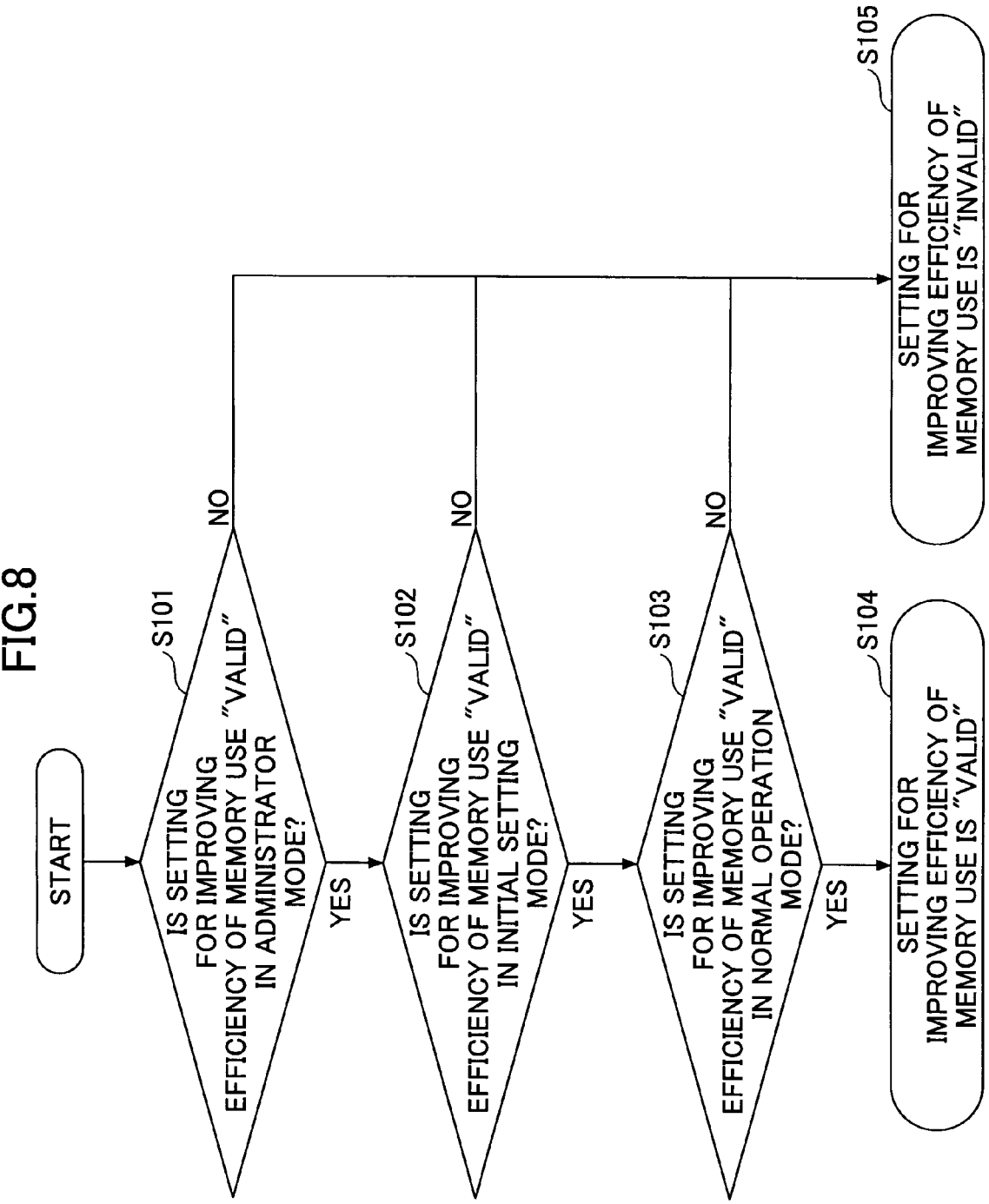
FIG. 8 is a flowchart for judging whether setting for improving efficiency of memory use is valid or invalid.

FIG. 8 is a flowchart for judging whether the setting for improving the efficiency of memory use is valid or invalid. Information on whether setting in each mode is valid or invalid is assumed to be stored in the NVRAM 43 of the printer 1 in advance, for example.

First, whether the setting in the administrator mode is valid or invalid is judged (S101). If the setting is judged to be valid (YES in S101), the process proceeds to step S102. If the setting is judged to be invalid (NO in S101), the process proceeds to step S105.

When the process proceeds to step S102, whether the setting in the initial setting mode is valid or invalid is judged (S102). If the setting is judged to be valid (YES in S102), the process proceeds to step S103. If the setting is judged to be invalid (NO in S102), the process proceeds to step S105.

When the process proceeds to step S103, whether the setting in the normal operation mode is valid or invalid is judged (S103). If the setting is judged to be valid (YES in S103), the process proceeds to step S104. If the setting is judged to be invalid (NO in 103), the process proceeds to step S105.

If the process proceeds to step S104, the setting for improving the efficiency of memory use is judged to be valid (S104).

If the process proceeds to step S105, the setting for improving the efficiency of memory use is judged to be invalid (S105).

Whether the setting for improving the efficiency of memory use is valid or invalid is judged as in the above-mentioned flow. Moreover, if the setting in the administrator mode is valid, the selection in FIG. 5 is valid. If the setting in the administrator mode is valid and the setting in the initial setting mode is valid, the screen as shown in FIG. 6 is displayed.

In accordance with the above-mentioned display contents and setting method, setting for improving the efficiency of memory use is separated in terms of authority. Specifically, the administrator, initial setting, and normal operation (user) are separated in descending order of authority and a person with lower authority performs setting based on contents set by a person with higher authority.

Thus, it is possible to limit the setting for improving the efficiency of memory use based on authority.

Further, by holding the setting in the NVRAM 43 of the printer 1, for example, it is possible to hold the setting after the printer 1 is powered off.

(Operational Example)

Figure 9:
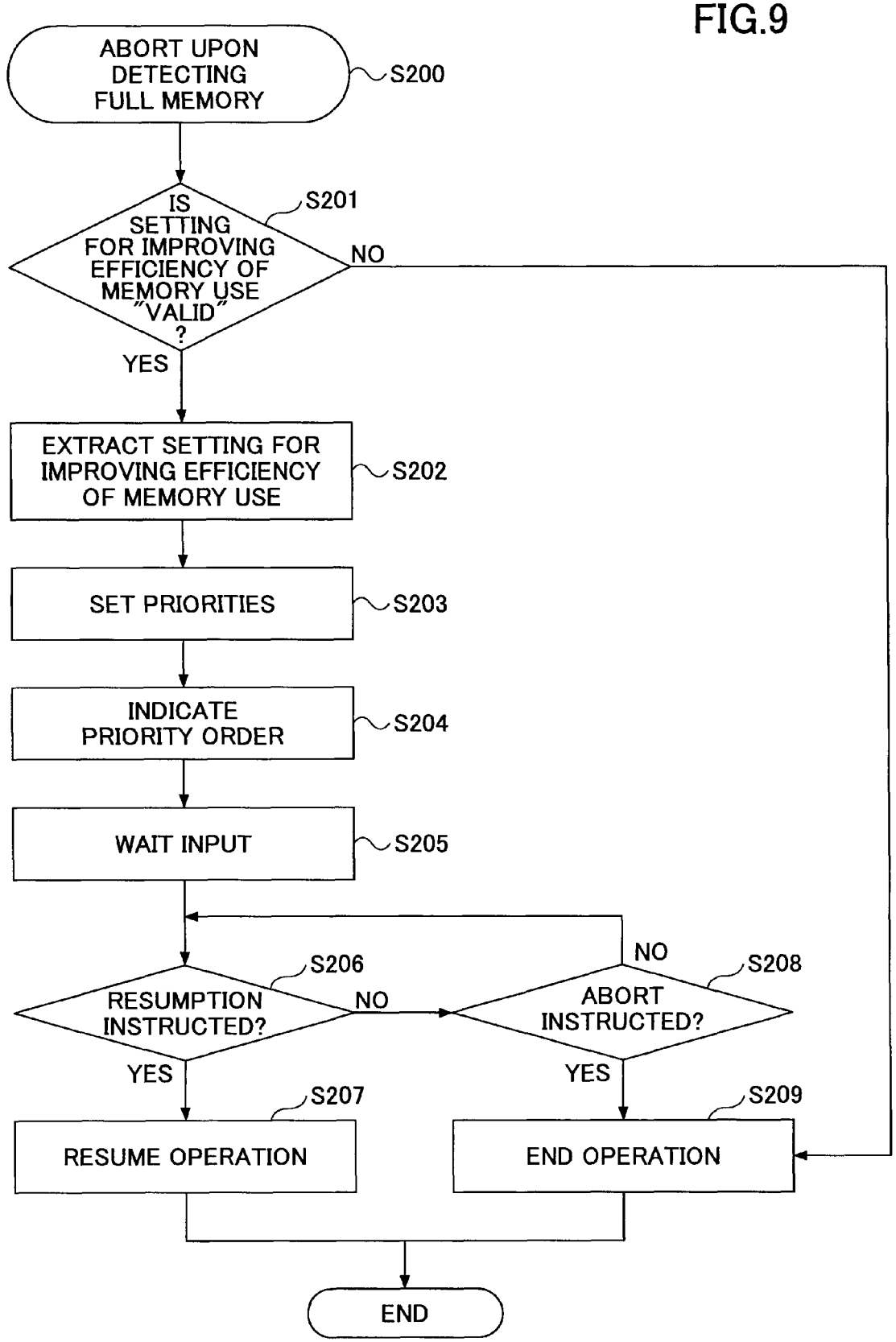
FIG. 9 is a flowchart of an operational example of an image forming apparatus according to the present invention.

The following describes an example of operation in which the method for storing image data in the image data storage unit 300 is changed to a single storage method extracted through priority setting, for example, from the plural methods for storing image data (stored in the storage method storing unit 450) set in advance as mentioned above with reference to FIGS. 9 to 14. FIG. 9 is a flowchart of the operational example of the image forming apparatus according to the present invention.

The printer 1 is assumed to make three copies in a color mode and the sorting mode. The operational example of the printer 1 is described based on a case where accumulation of four pages of an A4 document is ended, full memory is detected while a fifth page is being read, and the input operation is aborted (refer to FIG. 10).

First, when the full memory is detected, the printer 1 is assumed to stop operation (S200). When the full memory of the image data storage unit 300 is detected by the available capacity detection unit 410 and the available capacity judgment unit 420, the storage method control unit 400 stops the operation of the printer 1.

Next, in the printer 1, whether the setting for improving the efficiency of memory use is valid or invalid is judged (S201). If the setting is judged to be valid (YES in S201), the process proceeds to step S202. If the setting is judged to be invalid (NO in S201), the process proceeds to step S209.

Whether the setting is valid or invalid is judged through the flow of operation shown in FIG. 8. Thus, description of details is omitted.

If the setting is judged to be valid, the process proceeds to step S202 and setting for improving the efficiency of memory use is extracted (S202).

In this case, the storage method control unit 400 extracts the four items of the color mode change, resolution change, finishing order change, and no automatic jam recovery from the storage method storing unit 450 as setting for improving the efficiency of memory use, the four items being set as enabled in the normal operation mode shown in FIGS. 5 to 7.

Next, the process proceeds to step S203 and priority setting is performed (S203).

In this case, priorities are set on the four items extracted in step S202. The priorities are set in descending order of the efficiency of memory use. In other words, the storage method control unit 400 sets priorities on the four items of the color mode change, resolution change, finishing order change, and no automatic jam recovery in terms of the efficiency of memory use as described in the following.

First, a memory capacity necessary for accumulating image data is described. A memory capacity necessary for accumulating image data on a single page of an A4 monochrome document is assumed to be X. In this case, a memory capacity necessary for accumulating image data on a single page of an A4 color document is 4X. The printer 1 of the present invention performs printing using a color print function of four colors of yellow (Y), magenta (M), cyan (C), and black (K) when a full-color mode is set. In other words, image data of the four colors of Y, M, C, and K necessary for printing is accumulated as image data, so that the memory capacity necessary for the full-color mode becomes four times in comparison with a monochrome mode.

In this operational example, the full memory detection capacity Sf is assumed to be 19X. After the four pages of the document are accumulated, the full memory is detected in the fifth page, so that Sf(=19X)<16X+4X(=20X). In this case, a capacity of image data that can be accumulated without exceeding the full memory detection capacity Sf is 19X−16X=3X.

The following sequentially describes details of the four items of the color mode change, resolution change, finishing order change, and no automatic jam recovery mainly on effects on the efficiency of memory use.

The color mode change refers to changing from the color mode to the monochrome mode. When the color mode is changed to the monochrome mode, the memory capacity necessary for accumulating image data on a single page of a document becomes X. Thus, it is possible to accumulate three pages of the document until the full memory is detected.

The resolution change refers to changing resolution. In this operational example, image formation with a resolution of 600 dpi is changed to image formation with a resolution of 200 dpi through the resolution change. In this case, the memory capacity necessary for accumulating image data on a single page of the document becomes 4X/3. Thus, it is possible to accumulate two pages of the document until the full memory is detected. In this case, Sf(=19X)>16X+4X/3×2.

Figure 10:
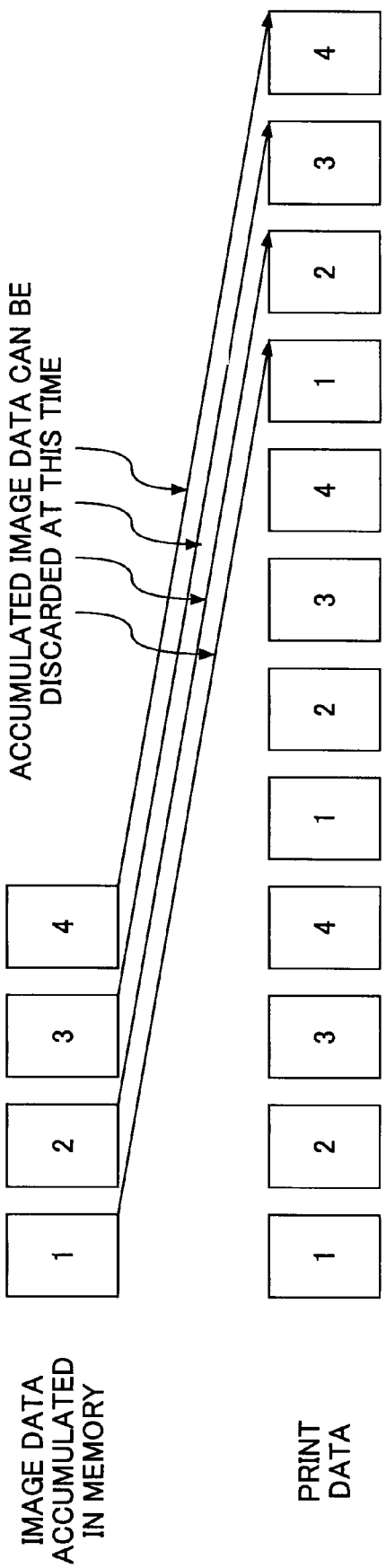
FIG. 10 is a diagram showing an example of a sorting mode of an embodiment.
Figure 11:
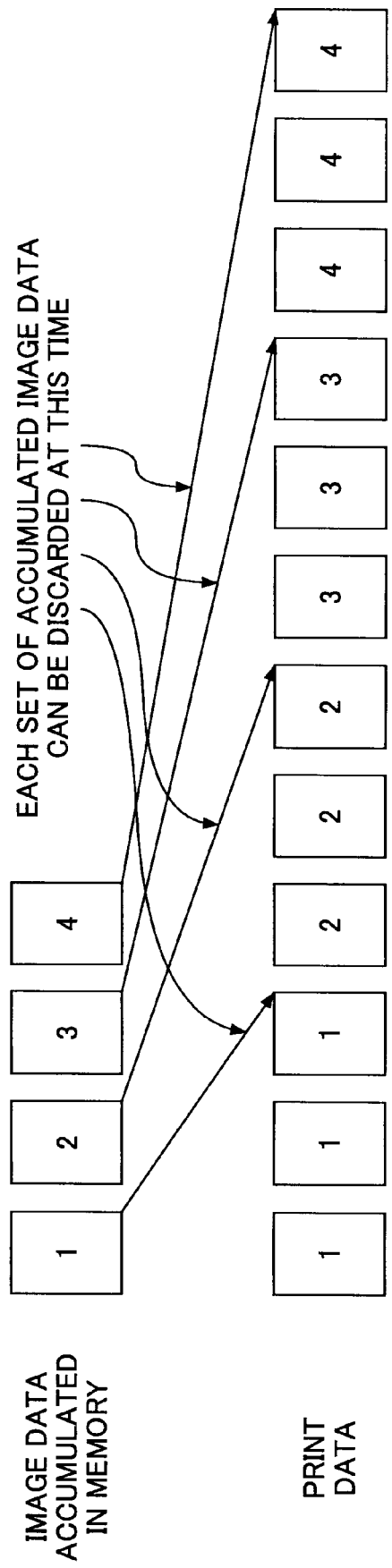
FIG. 11 is a diagram showing an example of a stacking mode of an embodiment.

The finishing order change refers to changing finishing from the sorting mode to a stacking mode. The sorting mode is briefly described with reference to FIG. 10. In addition, the stacking mode is described with reference to FIG. 11. FIG. 10 is a diagram showing an example of the sorting mode. FIG. 11 is a diagram showing an example of the stacking mode.

The sorting mode and the stacking mode are a finishing mode. In the sorting mode, when plural copies of a document of plural pages are printed, each copy is output and sorted in page order. FIG. 10 shows output copies in which a document of four pages is printed and output in the sorting mode. On the other hand, in the stacking mode, each page of the document is repeatedly output as many as the number of copies. FIG. 11 shows output copies in which the document of four pages is printed and output in the stacking mode.

As understood from FIGS. 10 and 11, in the sorting mode, image data on the document must be held until a last page of the document is output, so that a possibility of generation of insufficient memory is increased in comparison with the stacking mode. In other words, by changing from the sorting mode to the stacking mode, it is possible to reduce the generation of insufficient memory.

Figure 12:
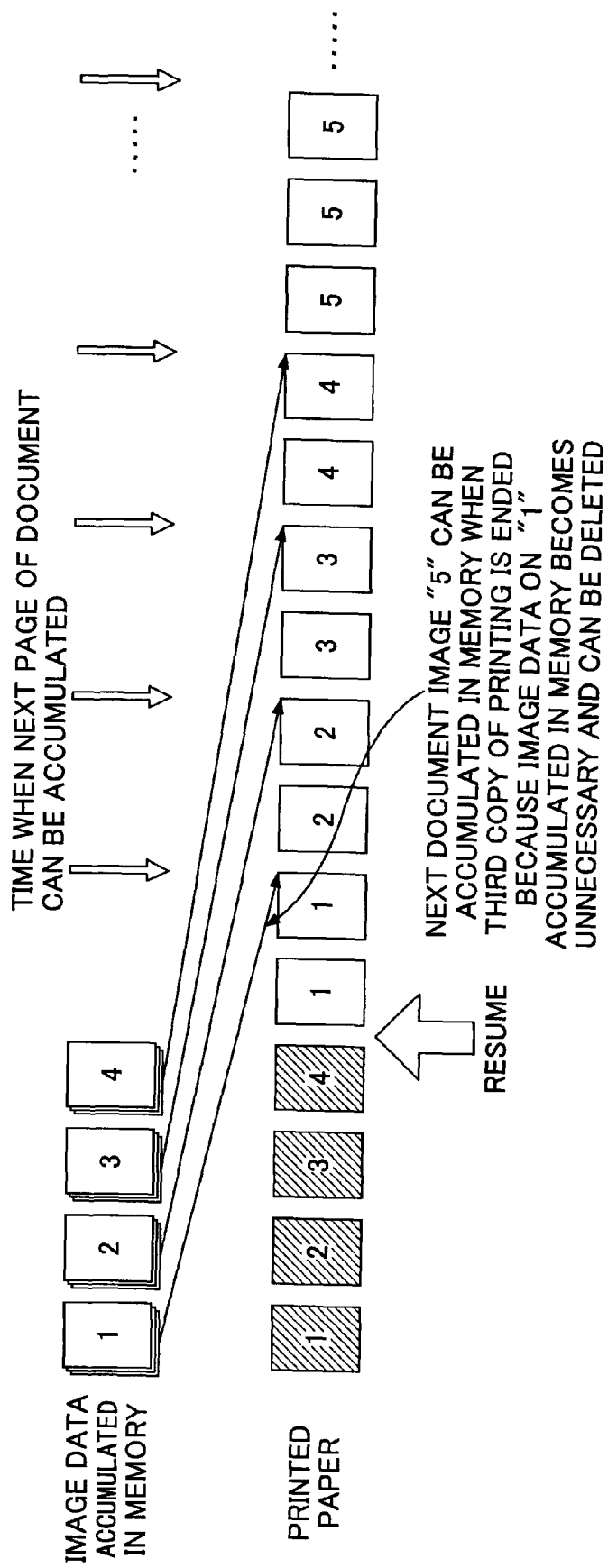
FIG. 12 is a diagram showing a change of finishing order in an operational example of an image forming apparatus according to the present invention.

When the finishing order is changed from the sorting mode to the stacking mode, as shown in FIG. 12, an output of copies is started from a first page of the document. Accordingly, when a third sheet of the first page of the document is output, a memory capacity of 4X becomes available and it is possible to accumulate the next page. Further, in the stacking mode, the image storage area G may accumulate and hold image data on a single page handled as an output object or up to the next page of the output object of the document so as to improve productivity. It not necessary to hold image data on all the pages of the document in the image storage area G. In other words, only a memory capacity of 4X(or 8X) is necessary, so that Sf(=19X)>ΣS(=4X) without the possibility of generation of insufficient memory. In accordance with this, the efficiency of memory use becomes highest.

The no automatic jam recovery refers to disabling a function of automatic jam recovery. The automatic jam recovery is a function by which when a recording medium remains in the device and is not normally ejected before an output is completed upon printing, the user removes the remaining recording medium and when it is possible to resume image formation, the device performs printing again from image data on a page that has not been normally output. In order to enable this function, it is necessary to accumulate image data until a last copy of printing of the image is completely ejected outside an image formation area. By disabling the automatic jam recovery function, it is possible to delete image data necessary for a last sheet of a copy of the image when the image data is transferred to the image data output unit 500. However, the efficiency of memory use is not improved when the full memory is generated while image data on the document is accumulated in a mode such as the sorting mode in which each copy is output and sorted in page order.

In accordance with this, in step S203, the storage method control unit 400 sets priorities in order of the finishing order change, color mode change, resolution change, and no automatic jam recovery.

Next, the process proceeds to step S204 and a result of the order of priority is indicated to the user (S204)

Figure 13:
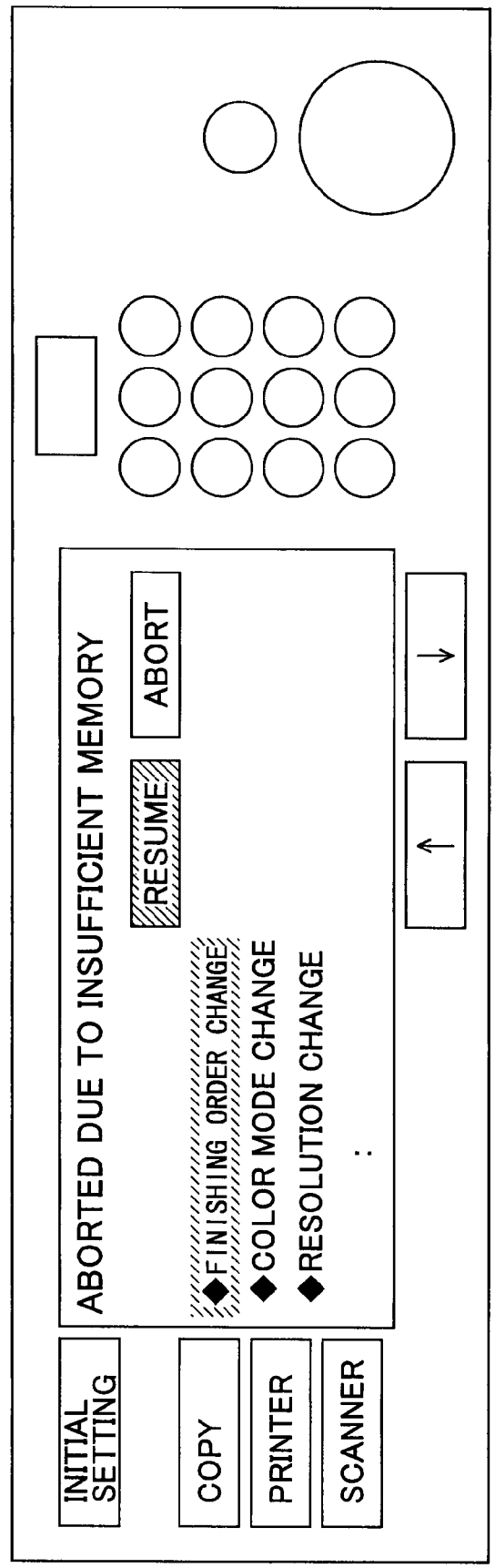
FIG. 13 is a diagram showing a display unit in step S204 of an operational example of an image forming apparatus according to the present invention.
Figure 14:
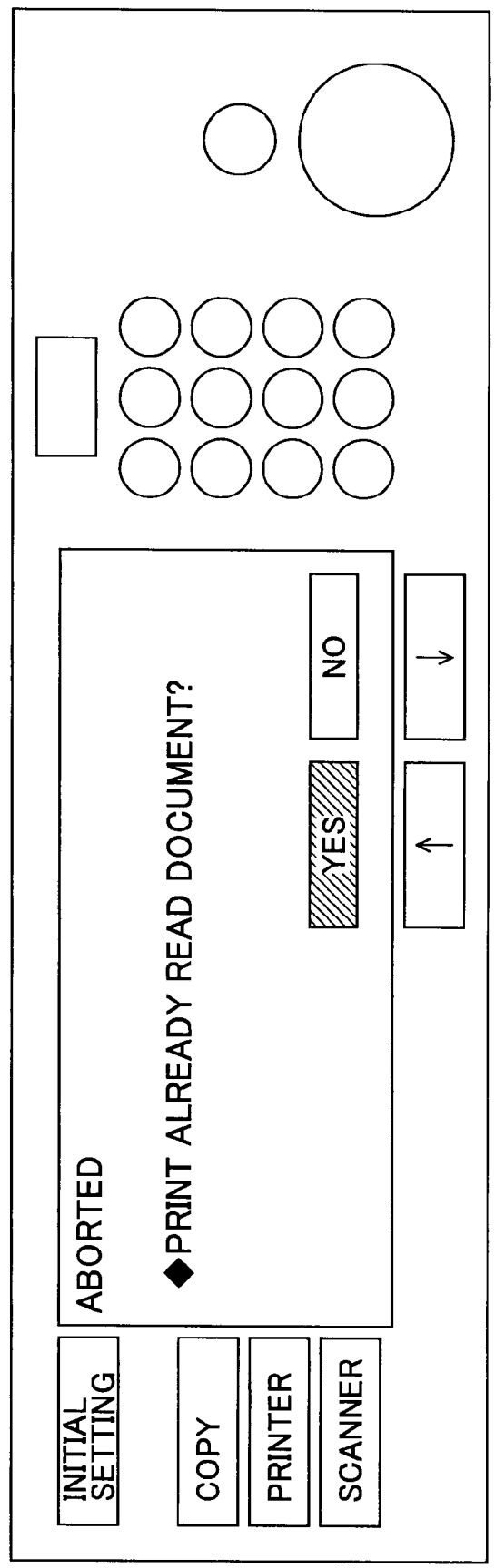
FIG. 14 is a diagram showing a display unit in step S209 of an operational example of an image forming apparatus according to the present invention.

In step S204, the storage method selection unit 440 prompts the selection of the storage method using the operation display unit 200. The selection is described with reference to FIG. 13. FIG. 13 is a diagram showing the display portion in step S204 of the operational example of the image forming apparatus according to the present invention. As shown in FIG. 13, the operation display unit 200 performs screen display based on the order of priority set in step S203.

Next, the process proceeds to step S205 and enters a waiting status for input from the user (S205). In this case, the operation display unit 200 having a user interface function awaits resumption or abort input.

Next, the process proceeds to step S206 and whether resumption is instructed is judged (S206). If the resumption is instructed (YES in S206), the process proceeds to step S207. If the resumption is not instructed (NO in S206), the process proceeds to step S208.

In step S206, the finishing order change is selected in the operation display unit 200 and when the resumption is input, a resumption signal that has been input is transmitted to the storage method control unit 400.

When the process proceeds to step S207, the storage method change unit 430 changes the storage method of the image data storage unit 300 from the sorting mode to the stacking mode based on the storage method selected in step S205, namely, the finishing order change in this case. Further, the storage method control unit 400 resumes operation of the printer 1.

If the resumption is not instructed, the process proceeds to step S208 and whether abort is instructed is judged (S208). If the abort is instructed (YES in S208), the process proceeds to step S209. If the abort is not instructed (NO in S208), the process returns to step S205 and processing of step S205 is repeated.

In step S208, when the abort is input in the operation display unit 200, an abort signal that has been input is transmitted to the storage method control unit 400.

When the process proceeds to step S209, the storage method control unit 400 ends the operation of the printer 1 (S209).

In accordance with the above-mentioned operation, in the printer 1 of the present invention, the image data storage method of the image data storage unit 300 is changed to the finishing order change as a single storage method extracted based on the priorities set on the plural methods for storing image data as mentioned above.

This enables a change of the finishing mode from the sorting mode to the stacking mode without disposing an additional memory and improves the efficiency of operation upon generation of the full memory without increasing a cost.

In addition, in step S203 of the operational example, the priorities are set in descending order of the efficiency of memory use. However, the priorities may be set in ascending order of a cost of image formation. Moreover, the priorities may be set in ascending order of finishing time.

In the operational example, regarding the storage method in the image data storage unit 300 of the printer 1 of the present invention, the priorities are set on the color mode change, resolution change, finishing order change, and no automatic jam recovery. However, the size reduction or the duplex→simplex may be selected. These two items are described in the following.

The size reduction refers to reducing a size of image data and storing the reduced image data. For example, by reducing the image data by half, it is possible to efficiently use a half of the memory.

The duplex→simplex refers to putting together reduced image data on two pages of a monochrome document as data on a single page of the document and storing the data, for example. In accordance with this, a number of paper used upon outputting image data is reduced by half. Moreover, an amount of toner used in this case is also reduced by half, so that it is possible to output image data at a low cost.

Although the memory capacity necessary for accumulating image data on a single page of an A4 color document is 4X, the memory capacity may be 3X using three colors of R, G, and B.

In step S208, if the abort is instructed, the process proceeds to step S209 and operation of the printer 1 is ended in the operational example. However, a screen for allowing the user to select whether to output image data already stored in the image data storage unit 300 may be displayed. In this case, the storage method control unit 400 displays a screen shown in FIG. 14 via the operation display unit 200. If YES is selected in FIG. 14, the image data output unit 500 performs output based on the image data already stored in the storage unit 300. If NO is selected, the image data output unit 500 does not perform output and the operation of the printer 1 is ended.

(Variation of Operational Example)

In the following, a variation of the operational example of the printer 1 of the present invention is described with reference to the drawings. In the display contents and setting method of the above-mentioned embodiment, in the normal operation mode, the four items of the color mode change, resolution change, finishing order change, and no automatic jam recovery are set as enabled (refer to FIG. 7). In the following, an operation is described when the finishing order change is disabled, and the three items of the color mode change, resolution change, and no automatic jam recovery are enabled (refer to FIG. 15). A flow of operation is the same as in the above-mentioned operational example, so that the variation is described with reference to FIG. 9.

Processing from step S200 to step S201 is the same as in the above-mentioned operational example, so that description is omitted.

When the process proceeds to step S202, setting for improving the efficiency of memory use is extracted (S202).

Figure 15:
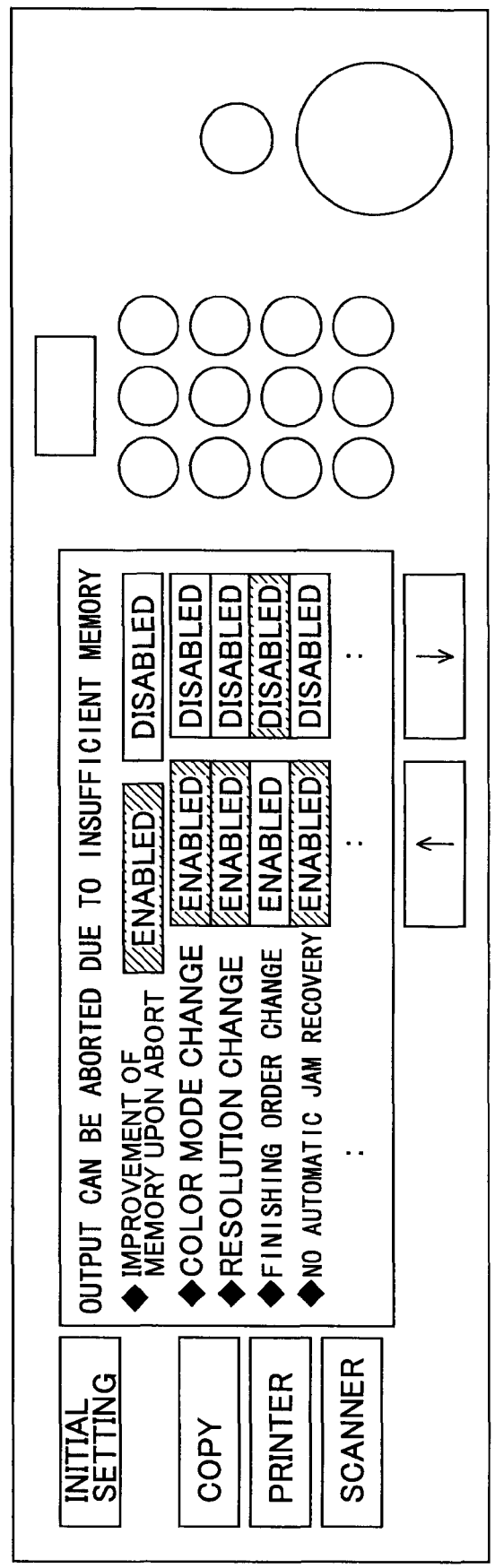
FIG. 15 is a diagram showing an example of display contents in a normal operation mode of a variation of an embodiment.

In step S202, the storage method control unit 400 extracts, as setting for improving the efficiency of memory use, the three items of the color mode change, resolution change, and no automatic jam recovery set as enabled in the normal operation mode shown in FIG. 15.

Next, the process proceeds to step S203 and priorities are set (S203).

In step S203, priorities are set on the three items extracted in step S202. The priorities are set in descending order of the efficiency of memory use. In other words, the priorities are set on the three items of the color mode change, resolution change, and no automatic jam recovery in terms of the efficiency of memory use. As a result of this, the priorities are set in order of the color mode change, resolution change, and no automatic jam recovery.

Next, the process proceeds to step S204 and the result of the order of priority is indicated to the user (S204).

Figure 16:
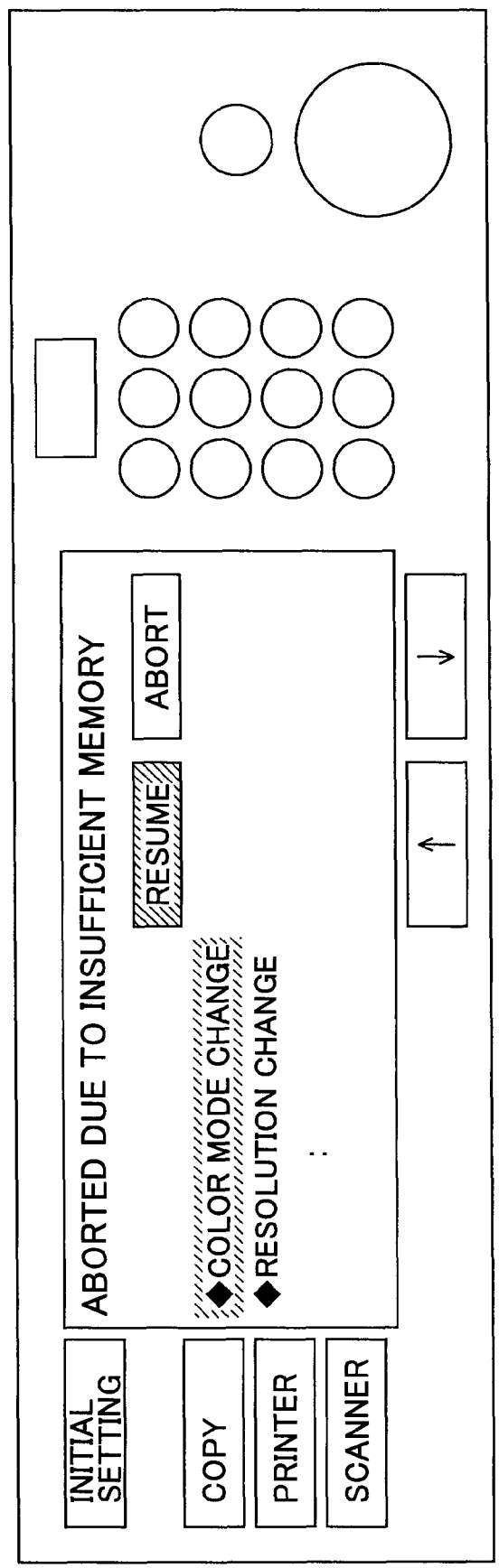
FIG. 16 is a diagram showing a display unit in step S204 of a variation of an operational example of an image forming apparatus according to the present invention.

In step S204, the storage method selection unit 440 prompts the selection of the storage method using the operation display unit 200. The selection is described with reference to FIG. 16. FIG. 16 is a diagram showing the display portion in step S204 of the variation of the operational example of the image forming apparatus according to the present invention. As shown in FIG. 16, the operation display unit 200 performs screen display based on the priority set in step S203.

Next, the process proceeds to step S205 and enters the waiting status for input from the user (S205). In this case, the operation display unit 200 having the user interface function awaits resumption or abort input.

Next, the process proceeds to step S206 and whether resumption is instructed is judged (S206). If the resumption is instructed (YES in S206), the process proceeds to step S207. If the resumption is not instructed (NO in S206), the process proceeds to step S208.

In step S206, the color mode change is selected in the operation display unit 200 and when the resumption is input, a resumption signal that has been input is transmitted to the storage method control unit 400.

When the process proceeds to step S207, the storage method change unit 430 changes the storage method of the image data storage unit 300 based on the storage method selected in step S205, namely, the color mode change in this case. In other words, the color mode is changed to the monochrome mode. Further, the storage method control unit 400 resumes operation of the printer 1.

If the resumption is not instructed, the process proceeds to step S208 and whether abort is instructed is judged (S208). If the abort is instructed (YES in S208), the process proceeds to step S209. If the abort is not instructed (NO in S208), the process returns to step S205 and processing of step S205 is repeated.

In step S208, when the abort is input in the operation display unit 200, an abort signal that has been input is transmitted to the storage method control unit 400.

When the process proceeds to step S209, the storage method control unit 400 ends the operation of the printer 1 (S209).

In accordance with the above-mentioned operation, in the printer 1 of the present invention, the image data storage method of the image data storage unit 300 is changed to the color mode change as a single storage method extracted based on the priorities set on plural methods for storing image data as mentioned above.

The present invention is not limited to the specifically disclosed embodiment, and variations and modifications may be made without departing from the scope of the present invention.

The present application is based on Japanese priority application No. 2006-189842 filed Jul. 10, 2006, the entire contents of which are hereby incorporated herein by reference.

What is claimed is:

1. An image forming apparatus, comprising:
   an image data input unit that inputs image data;
   an image data storage unit that stores the image data input by the image data input unit;
   a storage method change unit that changes an initial storage method of the image data input by the image data input unit;

an image data output unit that outputs the image data stored in the image data storage unit;

an available capacity detection unit that detects an available capacity of the image data storage unit;

an available capacity judgment unit that judges whether the available capacity is not more than a predetermined value; and a storage method selection unit that prompts selection of a new storage method to be performed by the image data storage unit, wherein when the available capacity is judged to be not more than the predetermined value by the available capacity judgment unit, the storage method selection unit prompts the selection of the new storage method, the storage method change unit changes the initial storage method of the image data based on the new storage method prompted by the storage method selection unit, and the image data output unit outputs image data stored in accordance with the new storage method, and wherein the image forming apparatus stores a setting for improving efficiency of using the image data, and when it is judged, by the information forming apparatus, that the setting is enabled, normal mode storage methods that are enabled in a normal operation mode of the information forming apparatus are extracted and prioritized.

2. The image forming apparatus according to claim 1, further including:

an operation display unit, that presents a display that prompts the selection of the new storage method to be performed by the image data storage unit.

3. The image forming apparatus according to claim 1, further including:

a storage method storing unit that stores the new storage method, wherein the storage method storing unit persistently stores the new storage method prompted by the storage method selection unit when the image forming apparatus is powered off.

4. The image forming apparatus according to claim 1, wherein the new storage method prompted by the storage method selection unit is determined in advance.

5. The image forming apparatus according to claim 1, wherein changing to the new storage method includes reducing a data size of the image data and storing image data having a reduced size.

6. The image forming apparatus according to claim 1, wherein changing to the new storage method includes putting together and storing the image data.

7. The image forming apparatus according to claim 1, wherein changing to the new storage method includes reducing one of a period of time for writing the image data into the image data storage unit and a period of time for reading the image data from the image data storage unit.

8. The image forming apparatus according to claim 1, wherein changing to the new storage method includes storing the image data, with a reduced resolution, that is lower than a resolution of the image data stored in the image data storage unit before the initial storage method is changed.

9. The image forming apparatus according to claim 1, wherein changing to the new storage method includes sequentially deleting the image data from the image data storage unit, the deleted image data being output by the image data output unit, and storing only a portion of the image data input by the image data input unit.

10. The image forming apparatus according to claim 1, wherein when the image data includes a color image, changing to the new storage method includes changing a color mode of the image data to a monochrome mode of the image data, and storing monochrome image data.

11. The image forming apparatus according to claim 1, wherein the normal mode storage methods include the new storage method.

12. The image forming apparatus according to claim 1, wherein the new storage method is selected from a prompt including the normal mode storage methods.

13. An image forming method implemented in an image forming apparatus, comprising:

inputting image data;

storing the image data in an image data storage unit in the image forming apparatus;

changing an initial storage method of the image data;

detecting an available capacity of the image data storage unit;

judging whether the available capacity is not more than a predetermined value; and storing a setting for improving efficiency of using the image data;

judging whether the setting is enabled; and extracting and prioritizing normal mode storage methods that are enabled in a normal operation mode of the information forming apparatus, when it is judged that the setting is enabled, wherein when the available capacity is judged to be not more than the predetermined value, prompting a selection of a new storage method, changing the initial storage method of the image data based on the new storage method, and outputting image data stored in accordance with the new storage method.

14. The image forming method according to claim 13, wherein changing to the new storage method includes changing between a sorting mode and a stacking mode.

15. The image forming method according to claim 13, wherein changing to the new storage method includes disabling an automatic jam recovery function.

16. The image forming method according to claim 13, wherein changing to the new storage method includes changing between a duplex printing mode and a simplex printing mode.

17. The image forming method according to claim 13, wherein the normal mode storage methods include the new storage method.

18. The image forming method according to claim 13, wherein the new storage method is selected from a prompt including the normal mode storage methods.

* * * * *